United States Patent
Allpress et al.

(10) Patent No.: US 8,654,662 B2
(45) Date of Patent: Feb. 18, 2014

(54) CARRIER DETECTION

(75) Inventors: Steve Allpress, Bristol (GB); Laolu Lijofi, Bristol (GB); Donal Price, Bristol (GB)

(73) Assignee: ICERA, Inc., Wilmington, DE (US)

( * ) Notice: Subject to any disclaimer, the term of this patent is extended or adjusted under 35 U.S.C. 154(b) by 698 days.

(21) Appl. No.: 12/808,070

(22) PCT Filed: Dec. 11, 2008

(86) PCT No.: PCT/EP2008/067330
§ 371 (c)(1),
(2), (4) Date: Aug. 19, 2010

(87) PCT Pub. No.: WO2009/077421
PCT Pub. Date: Jun. 25, 2009

(65) Prior Publication Data
US 2010/0322094 A1  Dec. 23, 2010

(30) Foreign Application Priority Data
Dec. 14, 2007  (GB) ...................................... 0724437

(51) Int. Cl.
*H04J 3/14* (2006.01)
(52) U.S. Cl.
USPC ............................ 370/252; 455/439; 713/323

(58) Field of Classification Search
None
See application file for complete search history.

(56) References Cited

U.S. PATENT DOCUMENTS

| | | | |
|---|---|---|---|
| 6,700,131 B2 * | 3/2004 | Nishihara et al. | 250/586 |
| 7,133,380 B1 | 11/2006 | Winters et al. | |
| 2009/0070053 A1 * | 3/2009 | Carrigan | 702/66 |
| 2013/0131851 A1 * | 5/2013 | Ullrich et al. | 700/94 |

FOREIGN PATENT DOCUMENTS

| | | |
|---|---|---|
| WO | 03063538 A1 | 7/2003 |
| WO | 2007036869 A2 | 4/2007 |
| WO | 2009077421 A1 | 6/2009 |

* cited by examiner

*Primary Examiner* — Andrew Lai
*Assistant Examiner* — Leon Andrews

(57) ABSTRACT

There is disclosed a method of determining one or more candidate frequencies for a carrier signal in a received signal, which method comprises: generating a narrowband spectrum of the received signal; detecting one or more peaks in the narrowband spectrum; generating a candidate frequency list, each frequency at which a peak occurs being included in the candidate frequency list. The method further comprises: removing the detected one or more peaks from the narrowband spectrum to generate a modified narrowband spectrum; detecting one or more further peaks in the modified narrowband spectrum; and modifying the candidate frequency list in dependence on the one or more further peaks.

22 Claims, 4 Drawing Sheets

CARRIER DETECTION

CROSS REFERENCE TO RELATED APPLICATION

This application is the National Stage of, and therefore claims the benefit of International Application No. PCT/EP2008/067330 filed on Dec. 11, 2008, entitled "CARRIER DETECTION," which was published in English under International Publication Number WO 2009/077421 on Jun. 25, 2009, and has priority based on GB0724437.9 filed on Dec. 14, 2007. Each of the above applications is commonly assigned with this National Stage application and is incorporated herein by reference in their entirety.

TECHNICAL FIELD

The present invention is concerned with the detection of carrier signals in a communications system. The invention is particularly, but not exclusively, concerned with the detection of carrier signals to enable a user equipment to make autonomous decisions or for the preparation of a received signal strength indication report in a mobile communications system.

BACKGROUND

Mobile communication systems in which mobile communication terminals, such as user equipment (UE) or mobile stations (MS), communicate with a network infrastructure via connections to network elements, such as to node-Bs or base stations, are well-known. In such mobile communication systems, mobile terminals typically roam and are not fixed in geographical location. As the mobile terminal roams, there is a need to adapt the node-B or base station to which a mobile terminal is connected to ensure that a reliable connection is maintained.

It is known in the art for mobile terminals to detect the strength of signals received from one or more node-Bs or base stations, and compile a report which may be returned to the network with the detected signal strength information. Based on this signal strength information the network is able to determine which node-B or base station the mobile terminal should preferably be connected to.

It is also known in the art for a full band scan to be invoked during a user equipment's cell detection process either when the user equipment fails to detect cells on a list of candidate channels or if it does not have such a list of candidate channels for a particular band. The scans comprise a number of successive search phases, the first of which is usually a so-called received signal strength indication (RSSI) scan. An RSSI scan identifies candidate channels and on which to perform further searches, by estimating the power received on each channel and detecting local peaks within this power spectrum.

It is highly desirable for RSSI scans to reliably detect carriers at levels right down to reference sensitivity, as this minimizes the time it can take for a user equipment to register and attach to a serving cell. If a valid cell is not detected by the RSSI scan, it may only be identified by performing an exhaustive search on every channel within the band
  a process which is computationally expensive and time consuming.

A well-performing RSSI scan reduces the need for exhaustive searches and therefore minimizes the time required by a user equipment to register with a network. It is therefore an aim of the invention to provide an efficient technique for performing an RSSI scan.

The RSSI scan result is primarily used by the user equipment to make autonomous decisions. In addition, the RSSI scan result may be reported to the network. In UMTS (universal mobile telecommunication services) mobile communication systems, it is therefore also known for user equipment to provide information on received signal strength to the network by compiling a RSSI (RSSI) report. The report may be compiled in the user equipment based on measurements associated with the signals received at the mobile terminal, and then transmitted to the network.

The transmission of such reports across the wireless link from the mobile terminal to the network side uses wireless resources. It is therefore also desirable to minimize the information necessary to be transmitted from the mobile terminal to the network side.

It is therefore a further aim of the invention to provide an improved technique for the provision of signal strength information in a communication system and for the generation and transmission of a received signal strength indication report in a UMTS mobile communication system.

SUMMARY

In accordance with the invention there is provided a method of determining one or more candidate frequencies for a carrier signal in a received signal, which method comprises: generating a narrowband spectrum of the received signal; detecting one or more peaks in the narrowband spectrum; generating a candidate frequency list, each frequency at which a peak occurs being included in the candidate frequency list.

The method further comprises: removing the detected one or more peaks from the narrowband spectrum to generate a modified narrowband spectrum; detecting one or more further peaks in the modified narrowband spectrum; and modifying the candidate frequency list in dependence on the one or more further peaks.

There is provided a computer program for performing the method described above.

The invention also provides an apparatus for determining one or more candidate frequencies for a carrier signal in a received signal, comprising: a spectrum estimation block adapted to estimate a narrowband spectrum of the received signal; a carrier detection block adapted to: detect one or more peaks in the narrowband spectrum; and generate a candidate frequency list, each frequency at which a peak is detected being included in the candidate frequency list.

The carrier detection block may be further adapted to: remove the detected one or more peaks from the narrowband spectrum to generate a modified narrowband spectrum; detect one or more further peaks in the modified narrowband spectrum; and modify the candidate frequency list in dependence on the one or more further peaks.

The invention further provides an apparatus for determining one or more candidate frequencies for a carrier signal in a received signal, comprising: means for estimating a narrowband spectrum of the received signal; means for detecting one or more peaks in the narrowband spectrum; and means for generating a candidate frequency list, each frequency at which a peak is detected being included in the candidate frequency list.

The apparatus may further comprise: means for removing the detected one or more peaks from the narrowband spectrum to generate a modified narrowband spectrum; means for detecting one or more further peaks in the modified narrowband spectrum; and means for modifying the candidate frequency list in dependence on the one or more further peaks.

There is provided a mobile entity of a mobile communication system comprising the apparatus.

BRIEF DESCRIPTION OF THE DRAWINGS

For a better understanding of the present invention, and to show how the same may be carried into effect, reference will now be made by way of example to the accompanying drawings in which.

DETAILED DESCRIPTION

The invention is described herein by way of embodiments in the context of a UMTS communications system in which a user equipment compiles a received signal strength indication report, which may be transmitted to the network, for cell detection purposes. The invention is not, however, limited to specific aspects of the embodiments as discussed herein. One skilled in the art will appreciate the broader applicability of the invention from an understanding of the embodiments described herein. In particular the invention is not limited to a UMTS communications system, details of which are presented herein merely to illustrate an implementation of the invention for a better understanding thereof.

In addition in the following discussion, only those elements of a mobile communication system which are necessary for an understanding of the invention are described. The general architecture and implementation of a mobile communication system in accordance with UMTS standards will be well understood by one skilled in the art.

Figure 1:
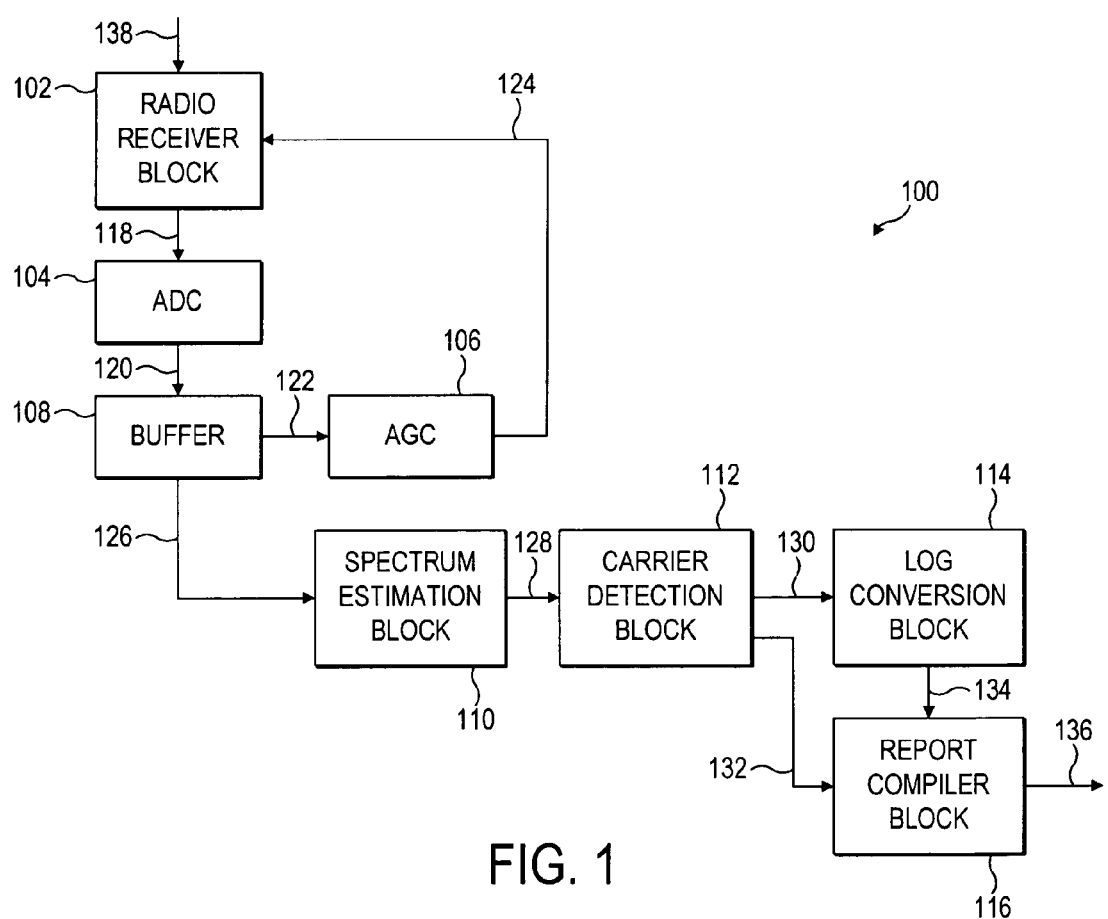
FIG. 1 illustrates in block diagram form the main function elements required for generation of an RSSI report in accordance with one embodiment.

The main functional elements of a UMTS user equipment for implementing a received signal strength indication scan and cell detection in accordance with embodiments is illustrated in FIG. 1.

As can be seen from FIG. 1, the RSSI scan and cell detection functionality is generally identified by reference numeral 100. The functionality includes a radio receiver block 102, an analog-to-digital converter (ADC) 104, an automatic gain controller (AGC) 106, a buffer 108, a spectrum estimation block 110, a carrier detection block 112, a log conversion block 114, and a report compiler block 116.

In general, in accordance with embodiments of the invention the functional elements of FIG. 1 receive raw ADC samples from the radio receiver, in order to produce an RSSI spectrum. In accordance with some embodiments, the RSSI spectrum includes estimates of the received signal strength indication for each UTRA (universal terrestrial radio access) absolute RF (radio frequency) channel number, known as UARCN in UMTS, within a scan. In general, this can be considered to be estimates of the received signal strength information, detected at the mobile terminal, for each frequency on which a carrier may be provided. Each such frequency represents a candidate carrier.

In addition, the RSSI spectrum includes a "ranking flag" for each UARFCN, or more generally for each frequency on which a carrier may be provided. The "ranking flag" indicates whether a carrier is likely to be present on that channel. The implementation of this technique is now further discussed.

With further reference to FIG. 1, the radio receiver block 102 receives radio signals on a connection indicated by line 138, representing radio signals received onto an antenna of the radio receiver. The radio receiver block 102 provides front-end processing of received signals to generate signals on line 118 as an input to the ADC 104. The digital samples generated by the ADC 104 are output on line 120 to the buffer 108, which stores such samples. The samples in the buffer 108 are provided on line 122 to the AGC 106. The AGC 106 operates in dependence upon such samples to provide gain control information on line 124 which forms an input to the radio receiver block 102. The operation of the radio receiver block 102, the ADC 104, the buffer 108 and the AGC 106 are in accordance with techniques well-known to one skilled in the art.

Figure 2:
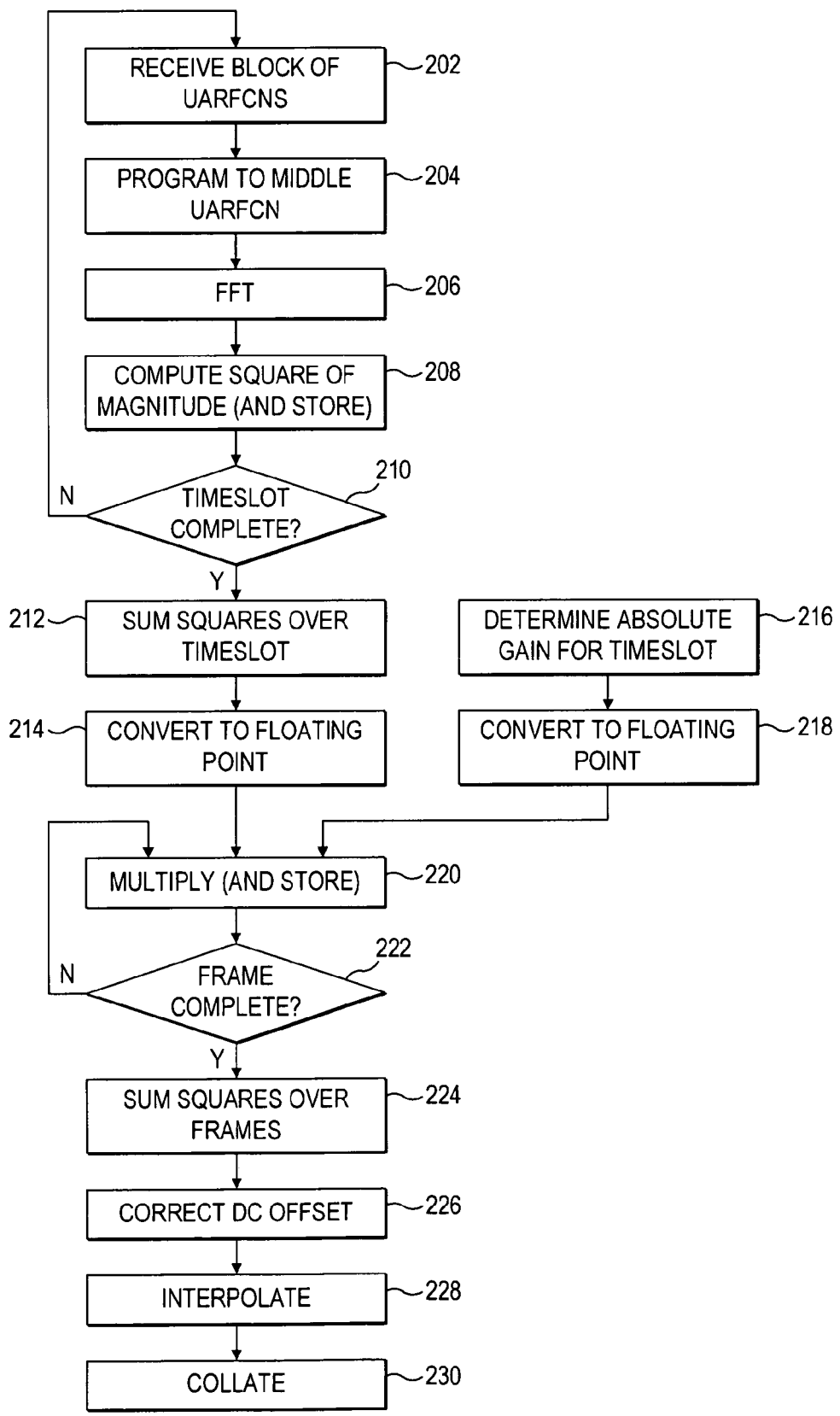
FIG. 2 is a flowchart illustrating the steps for generating a narrowband power spectrum in accordance with one embodiment.
Figure 3:
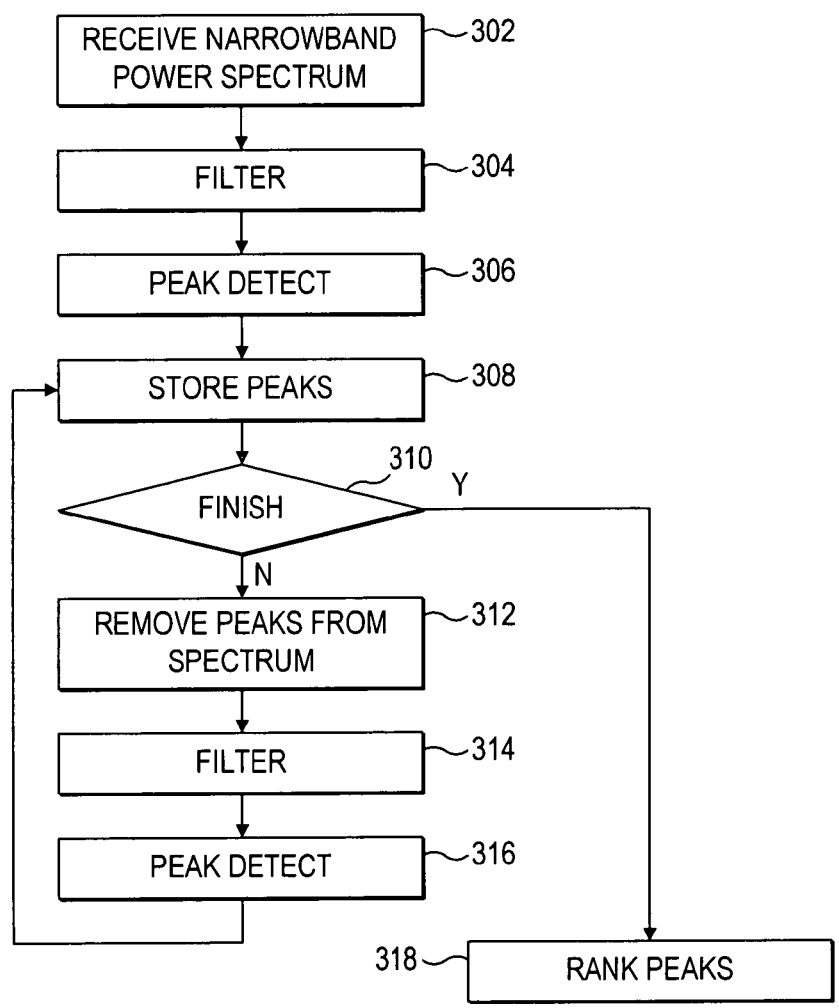
FIG. 3 is a flow diagram illustrating the steps for generating information for an RSSI report in accordance with one embodiment.
Figure 4:
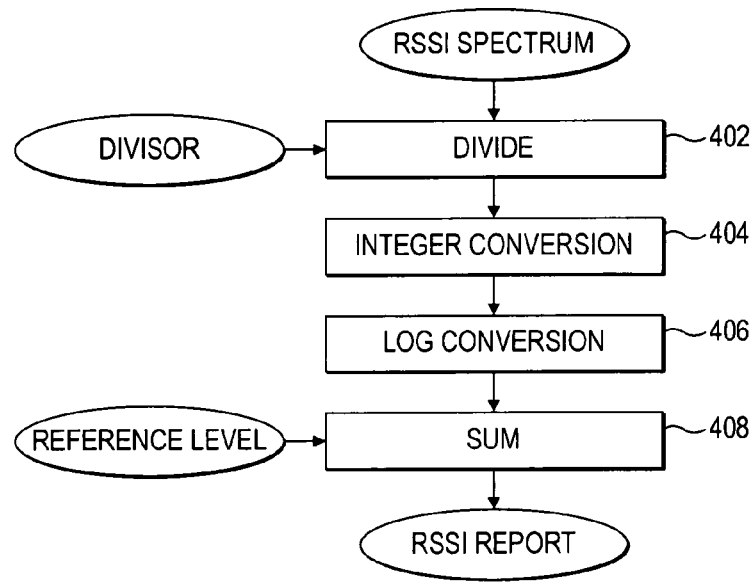
FIG. 4 illustrates the steps necessary for converting spectrum information in accordance with one embodiment.

The spectrum estimation block 110 receives the stored samples in the buffer 108 on line 126. The spectrum estimation block, which will be described further herein below with reference to FIG. 2, provides an output on line 128 to the carrier detection block 112. The carrier detection block 112, which will be described further herein below with reference to FIG. 3, provides an output on line 132 to the report compiler block 116, and an output on line 130 to the log conversion block 114. The log conversion block 114, which will be described further herein below with reference to FIG. 4, provides an output on line 134 to the report compiler block 116. The report compiler block 116 generates an output on line 136 in dependence upon the inputs on lines 132 and 134 as will be discussed in further detail herein below.

The spectrum estimation block 110 preferably produces a narrowband estimate of the power as received on each UARFCN. The spectrum estimation block partitions a scan of the received radio signal, stored in the buffer, into blocks of UARFCNs. In a UMTS system, the bandwidth of the baseband signals that are input to the ADC 104 is covered by a certain number of channels. Thus, in a one embodiment, the spectrum estimation block partitions the scan into blocks of the appropriate number of UARFCNs. For each block, the radio is programmed to the central UARFCN, AGC lock is acquired, and an FFT-based algorithm is used to compute the powers received on all UARFCNs within the block. The results from all blocks are then collated to produce the narrowband power spectrum. This is now described further with reference to FIG. 2.

With reference to FIG. 2, in a step 202 the spectrum estimation block 110 receives a block of a certain number of UARFCNs from the buffer 108 on line 126.

In a step 204, the spectrum estimation block 110 programs the radio to the middle UARFCN of the block. This step also involves acquiring AGC lock. Such steps are familiar to one skilled in the art.

In a step 206 an FFT (Fast Fourier transform) is performed. In a step 208 the squares of the magnitudes of each FFT bin are computed and summed. The FFT is performed for consecutive blocks of ADC sample data, each block being processed in accordance with steps 204, 206 and 208.

In one embodiment, the computation and summation takes place over one WCDMA (wideband code division multiple access) timeslot. The size of a timeslot may vary in dependence on the implementation.

In a step 210 it is determined whether all blocks for the WCDMA timeslot have been processed. If there are still blocks to be processed, then the process returns to step 202, and steps 204, 206 and 208 are repeated for subsequent blocks. The calculated FFT bins are also stored in step 208.

If in step 210 it is determined that all blocks for the WCDMA timeslot have been processed, then in a step 212 there is calculated, for the WCDMA timeslot, the sum of the squares of the magnitudes of each FFT bin, calculated in step 208 for successive FFT bins, for the WCDMA timeslot.

In a step 214, the FFT summed outputs are converted into a floating point format. The conversion into floating point format is discussed further herein below, but will be familiar to one skilled in the art.

In a step 220, the powers that are generated by summing the FFT outputs over one slot and provided after step 214 are multiplied by a "power per LSB" factor. This factor defines the absolute gain of the receiver during the slot.

The 'power per LSB' factor is provided by, in a step 216, determining the absolute gain of the receiver during the WCDMA timeslot for which the FFT outputs have been summed. In one embodiment this factor is provided in dBm form from the radio receiver block 102, and is converted to a linear factor by normalizing to a predetermined reference level.

Referring again to FIG. 2, the absolute gain determined in step 216 is then converted in a step 218 to a floating point format, in a step consistent with that of step 214. The floating point versions of the summed FFTs for the timeslot, and the absolute gain for the timeslot, provided respectively by steps 214 and 218, are then multiplied in step 220. The result of the multiplication is then also stored in step 220.

As a result for each timeslot there is provided a sum of the squares of a sequence of FFTs with an adjusted gain.

The thus adjusted FFTs for a given timeslot are then further summed over WCDMA frame periods. Thus in a step 222 it is determined whether the appropriate number of frame periods has been reached. If not, then the step 220 is repeated for subsequent WCDMA timeslots. If in step 222 it is determined that the appropriate number of frame periods has been reached, then in a step 224 the summation over the multiple WCDMA frame periods is implemented. Timeslots may be summed over one or more frames.

Thereafter, in a step 226, DC offset correction takes place. The ADC samples provided by ADC block 104 typically have a small DC component which typically raises the power in the 0 Hz FFT bin. This produces spikes in the combined RSSI spectrum at a period that is equal to the UARFCN block size. Whilst the spikes are smoothed in the subsequent matched RSSI filter implemented in the carrier detection block 112, they can result in degradation of the carrier detection function. Thus the removal of the DC offset is preferable. One skilled in the art will understand the principles of DC offset correction and be able to provide a suitable implementation in accordance with the objectives to be achieved and the implementation of other elements of the functionality.

After DC offset correction in step 226, in a step 228 interpolation takes place. The purpose of the interpolation is to produce narrowband estimates of the powers received.

After interpolation in step 228, in a final step 230 the FFT outputs are collated to produce the narrowband power spectrum.

Thus, as described with reference an embodiment in FIG. 2, the spectrum estimation block 110 provides at its output on line 128 a narrowband power spectrum. FIG. 2 describes an embodiment for determination of the narrowband power spectrum.

The invention is not limited to this embodiment. Other embodiments for generating a narrowband power spectrum may be utilized. However the embodiment set forth with reference to FIG. 2 offers particular advantages.

In the embodiment illustrated in FIG. 2, for spectrum estimation, the UARFCN's of the described UMTS implementation are portioned into blocks which do not necessarily coincide with the UARFCNs. This allows efficiency gains. The size of the clocks and channel spacings may be readily adapted to other systems.

In general, there are various ways in which the power spectrum may be computed, the process of FIG. 2 being illustrative of one technique. The technique minimizes detection time. The technique splits the spectrum into blocks of channels which are not necessarily aligned with the channel raster. Thus the spectrum may be split into blocks of channels independently of the channel raster.

The narrowband power spectrum on line 128 forms an input to the carrier detection block 112. The operation of one embodiment of the carrier detection block 112 is now described with reference to FIG. 3.

In general, the carrier detection block 112 applies a matched RSSI filter to the narrowband power spectrum to produce the RSSI spectrum, and then applies a peak detection function to generate a list of potential carrier frequencies. A rejection process, which may be implemented as an algorithm, removes spurious peaks from the list. In an optional following iterative process, the contributions of the detected carriers are removed from the narrowband power spectrum, and the RSSI filter and peak detection function are reapplied to identify any carriers to add to, or remove from, the list.

With reference to FIG. 3, in a step 302 the carrier detection block 112 receives the narrowband power spectrum provided by the spectrum estimation block 110, preferably in accordance with the techniques of FIG. 2.

In a step 304, a filtering operation takes place. The filtering operation comprises filtering of the narrowband power spectrum with a matched RSSI filter to produce the RSSI spectrum.

In a step 306, the RSSI spectrum is then scanned to identify peaks therein. An appropriate peak detection function, as known in the art, is utilized to generate a list of peaks, the carriers at which such peaks occur being identified as "primary" candidate carriers.

The peak detection function preferably searches the RSSI spectrum for local maxima. On detection of local maxima, the peak detection function may reject all peaks that are within a certain number of channel positions of a stronger peak.

Preferably no amplitude thresholds are used in identifying carrier frequencies, so the peak detection function is tolerant to changes in the noise floor. However, the absence of threshold testing may result in scans producing a number of false detections.

In a step 308, the identified peaks, or the carriers associated with such peaks, are stored.

The embodiment may involve an iterative process. If an iterative process is applied, then in a step 310 it is determined whether the iterative process is complete. If the iterative process is not complete, then the process proceeds to a step 312.

In step 312, the detected and stored peaks are removed from the narrowband power spectrum, to generate a modified narrowband power spectrum.

The carrier removal function of step 312 preferably removes the contributions of the carriers associated with detected peaks from the narrowband power spectrum by replacing the power values for those carrier positions with the lowest narrowband power that was measured for the whole band. In one embodiment, the power values are replaced on the carrier associated with a detected peak as well as carriers adjacent to that position, for example plus or minus a certain number of positions about the center frequency of a detected peak.

In a step 314, the modified narrowband power spectrum is then filtered with the matched RSSI filter to produce a modified RSSI spectrum.

In a step 316 peaks of the modified RSSI spectrum are detected. An appropriate peak detection function is used. The process then returns to step 308, and the peaks detected in step 316 are stored. In step 310 it is again determined whether the iterative process is complete, and if not the steps 312, 314 and 316 are repeated.

When it is determined in step 310 that the iterative process is complete, then in a step 318 the peaks stored in the process, or the candidate carrier frequencies associated with such peaks are ranked.

It should be noted that as a result of the iterative process multiple sets of peaks are detected. The initial set of peaks detected may be considered to be the "primary" carriers, and the second set of peaks detected may be considered to be the "secondary" carriers, etc.

The termination of the iterative process in step 310 may be controlled in a number of ways. In one embodiment there may be a preset number of iterations through which the process flows. In another embodiment, the iterative process may stop when on any given iteration no changes to the list of stored peaks are detected.

In one embodiment, in step 318 a ranking function flags the UARFCNs (i.e., the candidate frequencies) associated with the detected peaks as likely carrier frequencies, and also flags the immediate neighbors of the UARFCNs associated with the peaks as likely carrier frequencies.

The generation of the carrier lists, and the associated rankings, in step 318 may be achieved in a number of different ways. In one embodiment, all peaks detected on any iteration may be included in a list of potential candidate frequencies. In another embodiment, only candidate frequencies which are outside a certain distance of a candidate frequency position identified in the first iteration may be retained. For example, only candidate frequencies identified in a second iteration that are not within a certain number of positions of a candidate frequency identified in the first iteration, having a stronger peak, may be added to the primary list. In one embodiment, the preferred position distance may be plus or minus a certain number of channels.

In a further modification, an additional requirement may be that any primary candidate frequency that is at least a certain amount, e.g., X dB, weaker than a secondary candidate frequency within a defined number of positions (e.g., plus or minus 23 UARFCNs) may be removed from the list of candidate frequencies.

Each candidate frequency that is associated with a stored peak may be marked by an attribute that records the number of iterations after which the peak associated with the frequency was detected. This attribute provides a "confidence" measure for each carrier, which may be considered to be a ranking. Detections from earlier iterations may be considered to be more reliable than those from later iterations.

The candidate frequencies detected in the first iteration are considered to be the primary list of carriers. For each carrier in the primary list, the ranking function also may mark as candidate frequencies the UARFCNs at a certain number of positions either side of the candidate frequencies. The number of carrier positions either side of a carrier associated with a detected peak which are considered as candidate frequencies may be dependent upon the number of iterations at which the peak was detected. The number of carrier positions either side of the carrier position of a detected peak may increase or decrease as the number of iterations at which that peak was detected increases.

Thus the described embodiment provides for a number of carrier candidate frequency lists to be generated, which may be combined, with each carrier in the combined carrier list being accorded a ranking according to the number of iterations taken to identify the peak.

Referring to FIG. 1, the filtered RSSI spectrum on line 130 and the list of carrier positions, with ranking information, on line 132 may be used internally within the user equipment for autonomous decisions.

Referring to FIG. 1, the carrier detection block 112 also provides the list of carrier positions, and associated rankings, on line 132 to the report compiler block 116. In addition the carrier detection block 112 provides the RSSI spectrum, generated by filtering step 304 of FIG. 3, on line 130 to the log conversion block 114. The operation of the log conversion block 114 will now be described with reference to FIG. 4.

The log conversion block translates the linear RSSI spectrum into dBm form for the RSSI report, adjusting for the gains in the various processing blocks and the reference level used when converting the "power per LSB" parameter to linear form.

In a step 402, the RSSI spectrum is divided by: the power gain of the FFT in the spectrum estimation block 110; the slot integration; the summation over multiple slots (N, N being the number of slots); and the interpolation function of the spectrum estimation block 110 (3).

The result of this division is then converted to an integer in a step 404.

In a step 406 the powers are then converted to log form. In a step 408 a new reference level is then added to the log form to generate the RSSI values in units of dBm.

The thus converted RSSI spectrum is provided on line 134 to the report compiler block 116. The report compiler block 116 compiles the RSSI report, in dependence upon the inputs on line 132 and 134. The compiled RSSI report, which is compiled in accordance with techniques familiar to one skilled in the art, is then transmitted from the mobile terminal to the network, again in accordance with techniques familiar to one skilled in the art.

The information contained in the RSSI report is the RSI spectrum, and the list of candidate carrier frequencies and, optionally, the rankings of such locations.

Reference is made hereinabove to floating point arithmetic. Due to the large dynamic range of the power estimates, it is not possible to maintain 32-bit integer arithmetic throughout the processing chain. A custom floating point type can therefore be defined to support a greater dynamic range. The custom floating point type can be a 32-bit word with two bit fields: a 16-bit signed mantissa and a 16-bit signed exponent. The 16-bit precision for the mantissa is sufficient for the range of data that is combined in any summation operation, and the mantissas can be readily multiplied without need for carry logic.

The embodiment provides the ability to resolve closely positioned carriers. This is a result of being narrow resolution bandwidth used by the spectrum estimation block.

The embodiments provide for short scan times and high detection performance at low signal levels. These benefits result from the use of an efficient FFT-based algorithm for computing the RSSI spectrum. The low computational costs allow scan times to be minimized, and the integration times of power measurements to be increased.

The embodiments provide for a low probability of false detection, and resilience against problems where one carrier can swamp or bias a neighboring carrier. These benefits result from the rejection process and the iterative process utilized in the carrier detection block.

Figure 5:
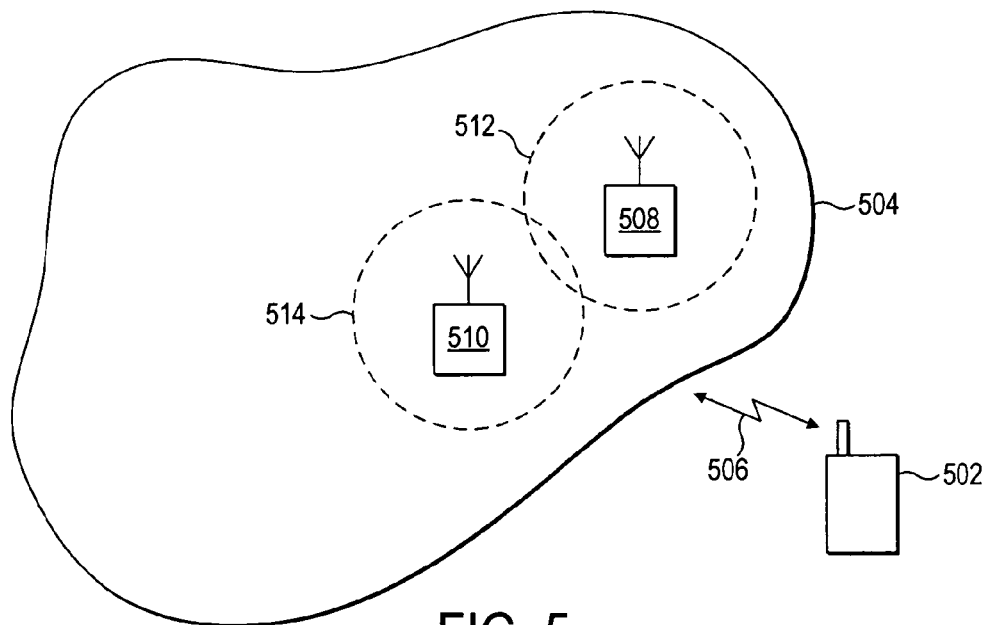
FIG. 5 illustrates schematically a communication system in embodiments may be implemented.

With reference to FIG. 5, there is illustrated a mobile communication environment in which embodiments of the present invention may be implemented. FIG. 5 illustrates a mobile terminal 502, and a wireless network generally denoted by reference 504. The wireless network 504 provides wireless coverage by way of a cellular system, whereby a plurality of base stations or node-Bs, such as node-Bs 508 and 510, each provide radio coverage over a defined cell. Thus node-B 508 provides radio coverage over cell 512, and node-B 510 provides radio coverage over cell 514. The mobile terminal 502 communicates with ones of the node-Bs 508 and 510, and other node-Bs, by way of a wireless interface 506. The techniques described in accordance with the embodiments disclosed in this description are implemented in the mobile terminal 502 for compiling an RSSI report. The RSSI report is transmitted by the mobile terminal 502 to the network via the node-B with which the mobile terminal is currently connected. This RSSI report may include information regarding the strengths of signal carriers received from multiple node-Bs, for example from node-Bs 508 and 510. The network then determines whether the node-B to which the mobile terminal is connected should be changed.

The foregoing description has described an embodiment for implementing the invention. The invention is not limited to specific embodiments, including apparatus and process steps, set forth in this description. Those skilled in the art will recognize that the invention has a broad range of applications, and that the described embodiments submit of a wide range of further modifications and applications. The scope of the invention is determined by the appended claims.

The invention claimed is:

1. A method of determining one or more candidate frequencies for a carrier signal in a received signal, which method comprises:
   generating a narrowband power spectrum of the received signal;
   detecting one or more peaks in the narrowband power spectrum;
   generating a candidate frequency list, each frequency at which a peak occurs being included in the candidate frequency list;
   removing contributions of carriers associated with the detected one or more peaks from the narrowband power spectrum to generate a modified narrowband power spectrum;
   detecting one or more further peaks in the modified narrowband power spectrum; and
   modifying the candidate frequency list in dependence on the one or more further peaks;
   wherein said generating, detecting, removing, and modifying is performed by a processor.

2. The method of claim 1 wherein the step of modifying comprises adding one or more further frequencies to the candidate list.

3. The method of claim 1 wherein the step of modifying comprises removing one or more frequencies from the candidate list.

4. The method of claim 1 further comprising transmitting the candidate list.

5. The method of claim 4 further comprising transmitting the narrowband power spectrum.

6. The method of claim 1 wherein the candidate list includes a ranking of each candidate.

7. The method of claim 6 wherein said ranking indicates whether the peak was identified in the narrowband power spectrum or the modified narrowband power spectrum.

8. The method of claim 1 wherein the steps of removing, detecting, and modifying are repeated iteratively.

9. The method of claim 8 wherein said ranking indicates in which iteration the peak was identified.

10. The method of claim 1 further comprising the step of identifying an immediate neighbor of any identified peak in the candidate list.

11. The method of claim 1 wherein the step of detecting peaks comprises rejecting all peaks that are within a certain number of positions of a stronger peak.

12. The method of claim 1 wherein the step of removing a detected peak from the narrowband power spectrum comprises replacing the power for the position of a detected peak with the lowest narrowband power that was measured for the whole band.

13. The method according to claim 12 wherein the step of removing a detected peak from the narrowband power spectrum comprises replacing the power for a number of positions adjacent of a detected peak with the lowest narrowband power that was measured for the whole band.

14. The method of claim 1 wherein all detected peaks in the modified narrowband power spectrum are added to the list of detected peaks.

15. The method of claim 1 wherein only detected peaks of the modified narrowband power spectrum that are within a certain number of frequency positions of a detected peak of the original waveform are added to the candidate list.

16. The method of claim 1 wherein only detected peaks of the modified narrowband power spectrum that are within a certain power of a detected peak of the modified waveform are added to the candidate list.

17. A computer program stored in a non-transitory computer readable storage media for performing the method of claim 1.

18. A computer program product for storing computer program code in a non-transitory computer readable storage media which, when run on a computer, perform the method of claim 1.

19. An apparatus for determining one or more candidate frequencies for a carrier signal in a received signal, comprising:
   a spectrum estimation block adapted to estimate a narrowband power spectrum of the received signal; and
   a carrier detection block adapted to:
   detect one or more peaks in the narrowband power spectrum;
   generate a candidate frequency list, each frequency at which a peak is detected being included in the candidate frequency list;
   remove contributions of carriers associated with the detected one or more peaks from the narrowband power spectrum to generate a modified narrowband power spectrum;
   detect one or more further peaks in the modified narrowband power spectrum; and
   modify the candidate frequency list in dependence on the one or more further peaks.

20. An apparatus for determining one or more candidate frequencies for a carrier signal in a received signal, comprising:

means for estimating a narrowband power spectrum of the received signal, means for detecting one or more peaks in the narrowband power spectrum;

means for generating a candidate frequency list, each frequency at which a peak is detected being included in the candidate frequency list, means for removing contributions of carriers associated with the detected one or more peaks from the narrowband power spectrum to generate a modified narrowband power spectrum;

means for detecting one or more further peaks in the modified narrowband power spectrum; and means for modifying the candidate frequency list in dependence on the one or more further peaks.

21. A mobile entity of a mobile communication system comprising apparatus according to claim 19.

22. A mobile entity of a mobile communication system comprising apparatus according to claim 19.

* * * * *